United States Patent
Shin et al.

(10) Patent No.: US 10,023,178 B2
(45) Date of Patent: Jul. 17, 2018

(54) APPARATUS AND METHOD FOR CONTROLLING TRANSMISSION PATTERN OF HYBRID VEHICLE

(71) Applicants: Hyundai Motor Company, Seoul (KR); Kia Motors Corporation, Seoul (KR)

(72) Inventors: Dong Jun Shin, Gyeonggi-Do (KR); Hyuk Jin Lee, Gyeonggi-Do (KR); Il Kwon Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 263 days.

(21) Appl. No.: 14/926,044

(22) Filed: Oct. 29, 2015

(65) Prior Publication Data

US 2016/0159342 A1 Jun. 9, 2016

(30) Foreign Application Priority Data

Dec. 3, 2014 (KR) .................. 10-2014-0171905

(51) Int. Cl.
*B60W 20/30* (2016.01)
*F16H 61/02* (2006.01)
*F16H 61/00* (2006.01)

(52) U.S. Cl.
CPC ............ *B60W 20/30* (2013.01); *F16H 61/00* (2013.01); *F16H 61/0213* (2013.01); *B60W 2510/244* (2013.01); *B60W 2710/1033* (2013.01); *F16H 2061/0096* (2013.01); *F16H 2061/0232* (2013.01); *Y10S 903/945* (2013.01)

(58) Field of Classification Search
None
See application file for complete search history.

(56) References Cited

U.S. PATENT DOCUMENTS 6,687,582 B1 2/2004 De La Salle et al.
8,157,035 B2 4/2012 Whitney et al.

FOREIGN PATENT DOCUMENTS

| JP | 2010-089777 A | 4/2010 |
|---|---|---|
| JP | 2011-201397 A | 10/2011 |
| JP | 2013-052796 A | 3/2013 |
| JP | 2013-086529 A | 5/2013 |
| JP | 2013-091469 A | 5/2013 |
| JP | 2014-065348 A | 4/2014 |

(Continued)

*Primary Examiner* — Shelley Chen
(74) *Attorney, Agent, or Firm* — Mintz Levin Cohn Ferris Glovsky and Popeo, P.C.; Peter F. Corless

(57) ABSTRACT

A method of variably controlling a transmission pattern of a hybrid vehicle is provided. The method converts a transmission pattern into a pattern that sufficiently secures engine charge power by considering the total amount of electric load when the transmission pattern is determined based on a current SOC state. The method variably controls the transmission pattern of a hybrid vehicle to prevent a battery SOC excessive decrease due to an increase of electric load of a vehicle by reflecting and compensating for the used amount of electric load of a hybrid vehicle when the type of transmission pattern is determined. Also, fuel efficiency is improved based on the improvement of battery charge efficiency by determining the transmission pattern such that the speed of a transmission input terminal increases when the electric load increases and thus securing the engine charge power for the battery charge.

10 Claims, 4 Drawing Sheets

(56) References Cited

FOREIGN PATENT DOCUMENTS

| KR | 10-1999-0029848 A | 4/1999 |
| KR | 10-2012-0029917 A | 3/2012 |
| WO | 2013-052803 A | 3/2013 |

APPARATUS AND METHOD FOR CONTROLLING TRANSMISSION PATTERN OF HYBRID VEHICLE

CROSS-REFERENCE TO RELATED APPLICATION

This application claims under 35 U.S.C. § 119(a) the benefit of Korean Patent Application No. 10-2014-0171905 filed Dec. 3, 2014, the entire contents of which are incorporated herein by reference.

BACKGROUND (a) Technical Field

The present invention relates to a method of variably controlling a transmission pattern of a hybrid vehicle. More particularly, the present invention relates to a method of controlling a transmission pattern of a hybrid vehicle, which converts a transmission pattern into a pattern that sufficiently secures engine charge power by considering the total amount of electric load when the transmission pattern is determined in accordance with a current state of charge (SOC) state.

(b) Background Art

The hybrid vehicles among eco-friendly vehicles promote the reduction of exhaust gas and the improvement of fuel efficiency by selecting a motor as well as an engine as a power source. Hybrid vehicles require a high efficiency and performance power transmission system which transmits the engine power or the motor power separately or simultaneously to the drive wheels.

FIG. 4 is a view illustrating an exemplary power transmission apparatus for a hybrid vehicle according to the related art. As shown in FIG. 4, a typical power transmission device for a hybrid vehicle includes an engine 10 and a motor 12 connected in series, an engine clutch 14 arranged between the engine 10 and the motor 12 to transmit or interrupt the engine power, a controller (not shown) configured to connect and disconnect of the clutch based on the driving situation, an inverter 20 configured to convert a battery current into an alternating current (AC) voltage and apply the AC voltage to the motor 12, an automatic transmission 16 configured to transmit the power of the motor or motor and engine to a drive wheel, and a Hybrid Starter Generator (HSG) 18 connected to a crank pulley of the engine to start the engine and generate electricity.

The automatic transmission is a stepped-speed transmission, the transmission pattern of which is determined by various factors. The factors determining the type of transmission pattern in a hybrid vehicle equipped with the stepped-speed transmission include inclination, temperature condition, State of Charge (SOC), driver selection mode, battery discharge limit condition, and drive mode determination. However, under the condition that the power consumption of the electric field load, air conditioner, and Electric Oil Pump (EOP) of a vehicle increases, a battery charge loss may occur, and the fuel efficiency may be reduced due to inefficient control and operation for charging a battery.

FIG. 1 is a flowchart illustrating a process of determining a transmission pattern in a hybrid vehicle according to the related art. As shown in FIG. 1, when the engine cooling water is less than a specific temperature, or the external temperature is less than a specific temperature, the transmission pattern is determined as a transmission pattern for prompt warm-up under a low temperature of winter season.

Additionally, when determined as a battery discharge limit situation, the transmission pattern is determined as a transmission pattern for complementing a motor assist output deficiency due to the battery discharge limit Furthermore, to determine the transmission pattern, it is determined whether the battery charge state meets the SOC reference condition. When the battery charge state meets the SOC reference condition, a predetermined transmission pattern is determined based on drive modes (e.g., extremely congested, congested, normal, national highway, expressway, etc.) based on the driver intention. On the other hand, when determined as not meeting the SOC reference condition, a low SOC transmission pattern is determined to promote the battery charge.

Referring to FIG. 2, the process of determining the transmission pattern by determining whether the SOC reference condition is met includes inputting drive mode into a transmission pattern determining part 100 using a lookup table 102, and inputting a current battery SOC into the transmission pattern determining part 100, and determining, by the transmission pattern determining part 100, the transmission pattern based on the current SOC and the drive mode.

In particular, when the current SOC is equal to or greater than a particular boundary value, the transmission pattern determining part 100 switches on similar to a relay and outputs "1", thereby determining the transmission pattern matching with the drive mode based on driver intention. When the current SOC is equal to or less than a particular boundary value, the transmission pattern determining part 100 switches off similar to a relay and outputs "0", thereby determining a low SOC transmission pattern that can promote the battery charge.

However, in the foregoing process of determining the type of the transmission pattern, since the electric load (e.g., electric field load+air conditioner load+EOP load) of a vehicle is not considered, when the identical engine power is output upon increase of electric load of a vehicle under the identical condition, the SOC of a battery becomes insufficient, leading to reduction of the fuel efficiency.

The above information disclosed in this section is merely for enhancement of understanding of the background of the invention and therefore it may contain information that does not form the prior art that is already known in this country to a person of ordinary skill in the art.

SUMMARY

The present invention provides a method for variably controlling the transmission pattern of a hybrid vehicle, which prevents a battery SOC excessive drop due to an increase of electric load of a vehicle by reflecting and compensating for the used amount of electric load of a hybrid vehicle when the type of transmission pattern is determined, and promotes the improvement of the fuel efficiency according to the improvement of battery charge efficiency by determining the transmission pattern such that the speed of a transmission input terminal increases when the electric load increases and thus securing the engine charge power for the battery charge.

In one aspect, the present invention provides a method for controlling a transmission pattern of a hybrid vehicle that may include determining the transmission pattern by determining whether a battery SOC reference condition of the hybrid vehicle is satisfied, wherein the transmission pattern is determined by further inputting a compensation value based on a used amount of electric load when a current battery SOC is input into a transmission pattern determining part.

In an exemplary embodiment, when the used amount of electric load is determined as increasing by a predetermined value or greater, a low stage-centered transmission pattern in which engine revolutions per minute (RPM) is able to increase may be determined. In another exemplary embodiment, the compensation value based on the used amount of electric load may be obtained by calculating an electric load index using the total sum of electric power consumption and mapping the calculated electric load index as the compensation value for determining the transmission pattern. In addition, the electric load index using the total sum of the electric power consumption may be calculated into a particular level value or greater, an intermediate value, and a particular level value or less.

In another aspect, the present invention provides an apparatus for controlling a transmission pattern of a hybrid vehicle that may include: a transmission pattern determining part configured to determine the transmission pattern by determining whether a battery SOC reference condition of the hybrid vehicle is satisfied; and an electric load compensation value calculating part configured to input a compensation value based on a used amount of electric load when a current battery SOC is input into the transmission pattern determining part. When the used amount of electric load is determined as increasing by a predetermined value or greater, a low stage-centered transmission pattern in which engine RPM is able to increase may be determined.

In an exemplary embodiment, the electric load compensation value calculating part may include an electric load index calculating unit configured to calculate an electric load index using the total sum of electric power consumption, and a mapping data unit in which the calculated electric load index may be mapped as the compensation value for determining the transmission pattern.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
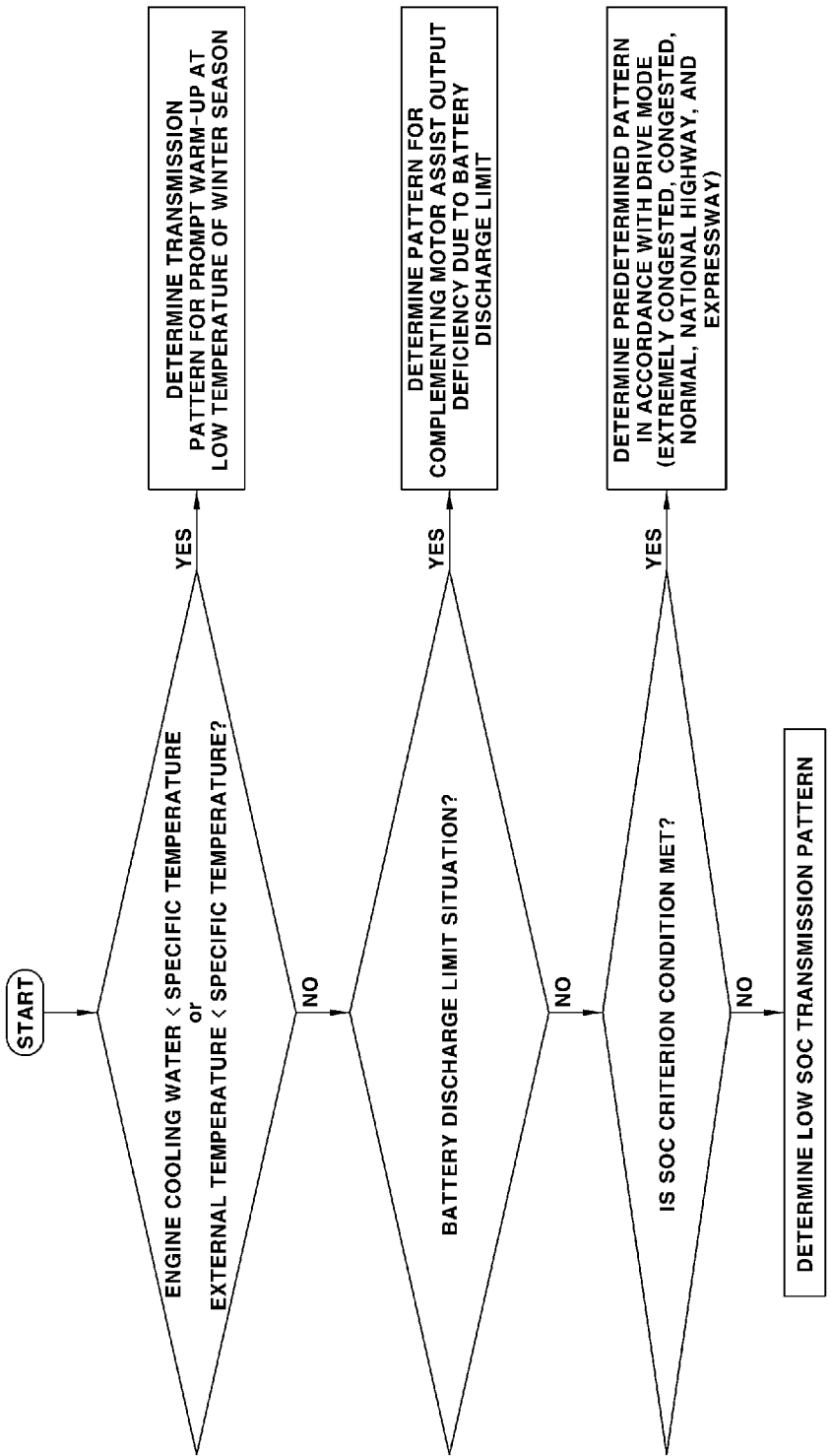
FIG. 1 is a flowchart illustrating a typical method of determining a transmission pattern in a hybrid vehicle according to the related art.
Figure 2:
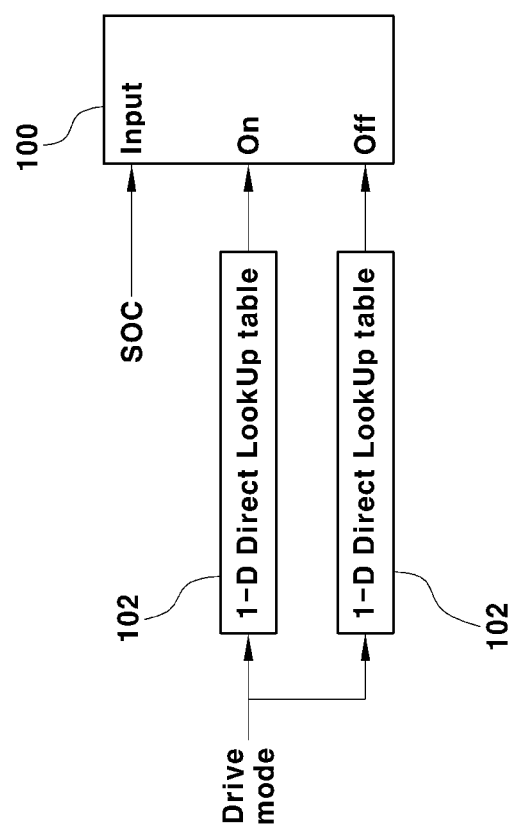
FIG. 2 is a view illustrating a typical method of determining a transmission pattern in a hybrid vehicle according to the related art.

Reference numerals set forth in the Drawings includes reference to the following elements as further discussed below:

100: transmission pattern determining part
102: lookup table
200: electric load compensation value calculating part
202: electric load index calculating unit
204: mapping data unit It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so that those skilled in the art can easily carry out the present invention.

As shown in FIG. 1, in determining a transmission pattern of a hybrid vehicle, when the engine cooling water is less than a particular temperature, or the external temperature is less than a particular temperature, the transmission pattern may be determined as a transmission pattern for prompt warm-up under a low temperature of winter season. Additionally, when determined as a battery discharge limit situation, the transmission pattern may be determined as a transmission pattern for complementing a motor assist output deficiency due to the battery discharge limit Furthermore, to determine the transmission pattern, it is determined whether the battery charge state meets the SOC reference condition. When the battery charge state meets the SOC reference condition, a predetermined transmission pattern is determined based on drive modes (e.g., extremely congested, congested, normal, national highway, expressway, etc.) based on driver intention. On the other hand, when determined as not meeting the SOC reference condition, a low SOC transmission pattern is determined to promote the battery charge.

The present invention provides an apparatus and method for controlling a transmission pattern of a hybrid vehicle, which may operate the transmission pattern mainly at low stages capable of increasing the engine RPM as electric loads increase and thus may secure engine charge power for battery charge, by indexing the electric load values and using the indexed electric load values as compensation values in determining a target transmission pattern based on the battery SOC when the transmission pattern is determined by detecting whether the battery SOC reference condition of a hybrid vehicle is met.

Figure 3:
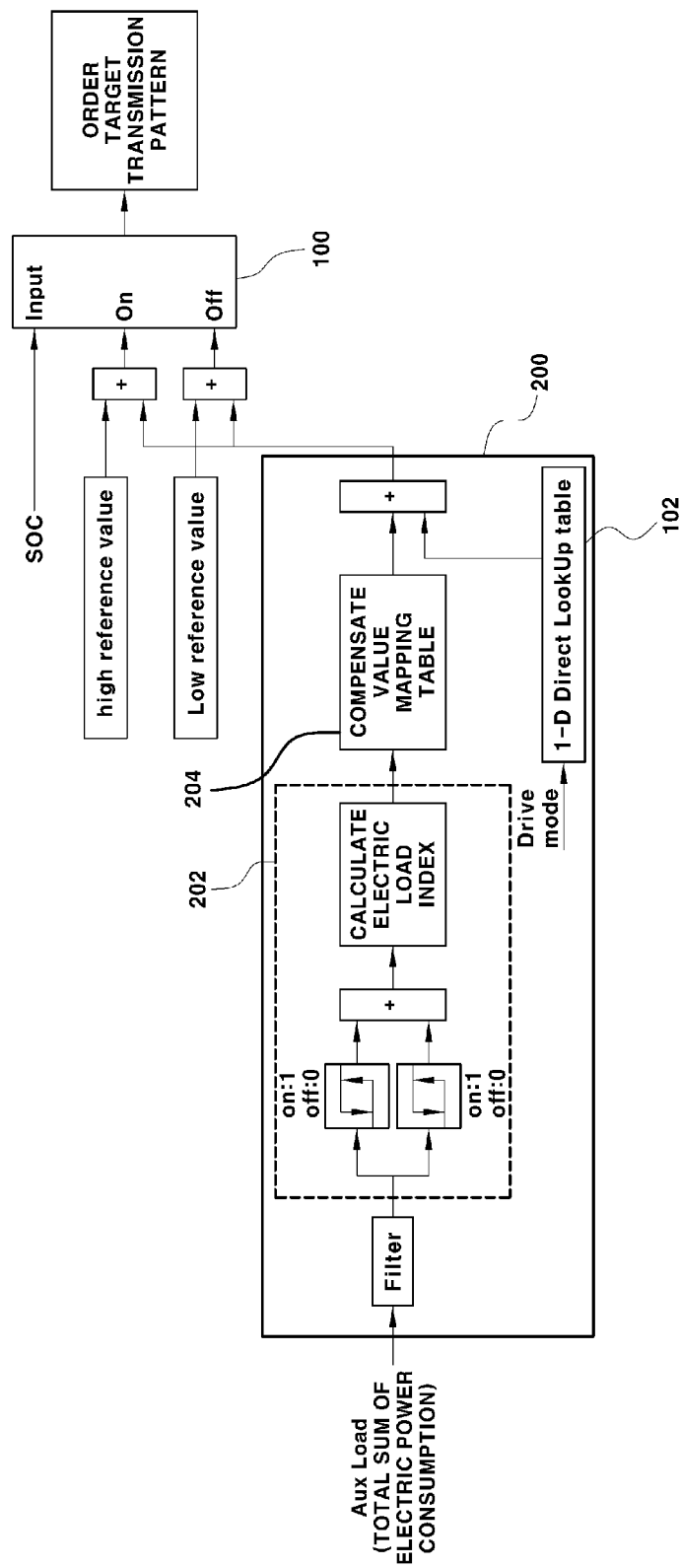
FIG. 3 is a view illustrating a control of a transmission pattern in a hybrid vehicle according to an exemplary embodiment of the present invention.
Figure 4:
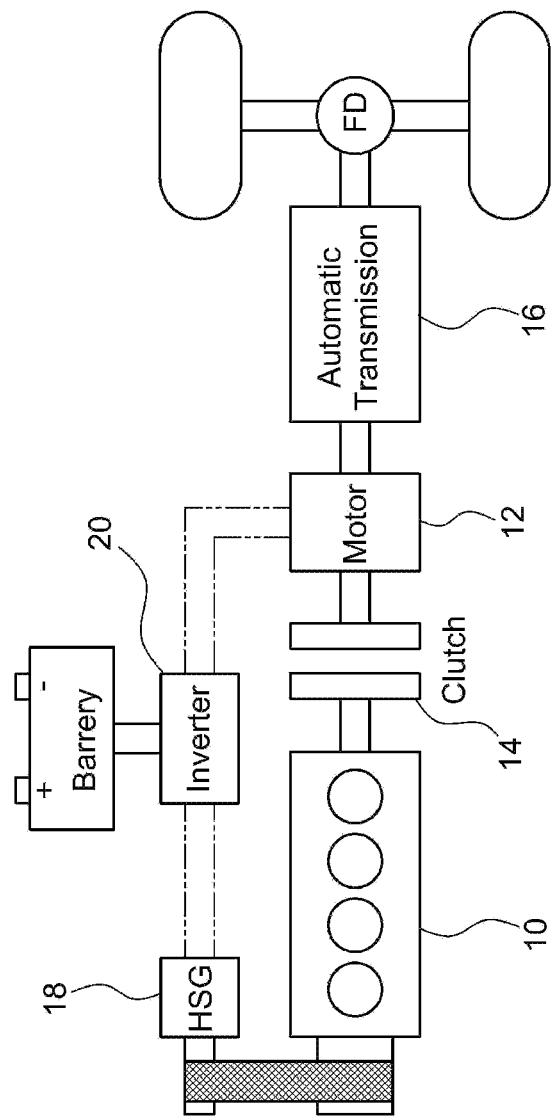
FIG. 4 is a view illustrating a power transmission system for a hybrid vehicle according to the related art.

FIG. 3 is a view illustrating a control of a transmission pattern in a hybrid vehicle according to an exemplary embodiment of the present invention. The various parts and units described herein below should be understood as being executed by a controller having a processor and a memory. In FIG. 3, the reference numeral 100 denotes a transmission pattern determining part of a transmission pattern controller.

In particular, the transmission pattern determining part 100 may be configured to determine whether the battery SOC reference condition of a hybrid vehicle is satisfied based on the drive mode according to driver intention and the current battery SOC, and may be configured to determine the transmission pattern. A current battery SOC may be input into the transmission pattern determining part 100 from a controller that manages the battery state. Further, a compensation value in which the drive mode according to driver intention may be reflected using a lookup table 102, i.e., a compensation value based on a used amount of electric load may be input into the transmission pattern determining part 100. The electric load compensation value calculating part 200 may include an electric load index calculating unit 202 configured to calculate an electric load index using the total sum of electric power consumption, and a mapping data unit (e.g., compensation value mapping table) 204 in which the calculated electric load index may be mapped as the compensation value for determining the transmission pattern.

Accordingly, when the compensation value based on the used amount of electric load is input into the transmission pattern determining part from the electric load compensation value calculating part 200, and then the transmission pattern determining part determines that the used amount of electric load increases by a particular value, the transmission pattern determining part 100 may be configured to determine and order the low stage-centered transmission pattern in which engine RPM may increase. For example, as the electric load increases, a low stage-centered transmission pattern in which the engine RPM may be increased may operate, enabling electricity generation of a starter-generator connected to the crankshaft of an engine and thus enabling battery charge by the electricity generation of the starter-generator.

Hereinafter, a method of controlling a transmission pattern in a hybrid vehicle according to an exemplary embodiment of the present invention will be described in more detail.

In response to determining whether the battery charge state, i.e., the SOC reference condition, is satisfied, when a current battery SOC is input into the transmission pattern determining part 100, the compensation value based on the used amount of electric load may be further input into the transmission pattern determining part 100 from the electric load compensation value calculating part 200. The compensation value based on the used amount of electric load may be obtained by calculating an electric load index using the total sum of electric power consumption and mapping the calculated electric load index as the compensation value for determining the transmission pattern. Thus, the compensation value based on the used amount of electric load, i.e., compensation value based on the electric load index may be input into the transmission pattern determining part 100 from the mapping data unit (e.g., compensation value mapping table) 204.

Moreover, to determine the transmission pattern in accordance with drive modes (e.g., extremely congested, congested, normal, national highway, expressway, etc.), the compensation value may be determined based on the electric load index from the mapping data unit (e.g., compensation value mapping table) 204 based on the transmission pattern determined using the lookup table 102. In particular, the electric load index using the total sum of the electric power consumption may be determined as a particular level value or greater when the total sum of the electric power consumption is filtered and then a pair of relays may be turned on, and may be determined as an intermediate value when one of the pair of relays is turned on. Additionally, the electric load index may be determined as a particular level value or less when the pair of relays are turned off.

Accordingly, the current battery SOC may be input into the transmission pattern determining part 100 from the controller that manages the battery state. Simultaneously, the compensation value based on the electric load index may be input into the transmission pattern determining part 100 from an electric load compensation value calculating part 200, and thus the transmission pattern may be determined.

In particular, when the current SOC is equal to or greater than a particular boundary value (e.g., a first reference value, high reference value), the transmission pattern determining part 100 may switch on similar to a relay and output "1", thereby determining the transmission pattern matching with the drive mode based on driver intention. On the other hand, when the current SOC is equal to or less than a particular boundary value (e.g., a second reference value, low reference value), the transmission pattern determining part 100 may switch off similar to a relay and output "0", thereby determining a low SOC transmission pattern that can promote the battery charge. Particularly, the used amount of electric load may be determined as increasing by a particular value based on the compensation value according to the electric load index, a low stage-centered transmission pattern in which the engine RPM may be increased may be determined When a low stage-centered transmission pattern in which the engine RPM may be increased operates as the electric load increases, electricity generation of the starter-generator connected to the crankshaft of an engine and thus battery charge by the electricity generation of the starter-generator may be achieved.

As described above, the present invention may prevent a battery SOC excessive decrease due to an increase of electric load of a vehicle by reflecting and compensating for the used amount of electric load of a hybrid vehicle when the type of transmission pattern is determined, and may promote the improvement of the fuel efficiency according to the improvement of battery charge efficiency by determining the transmission pattern such that the speed of a transmission input terminal increases when the electric load increases and thus securing the engine charge power for the battery charge.

The present invention provides the following effects.

First, the battery SOC excessive decrease due to an increase of electric load of a vehicle may be prevented by reflecting and compensating for the used amount of the electric load in a hybrid vehicle when the type of transmission pattern.

Second, the improvement of the fuel efficiency according to the improvement of battery charge efficiency may be promoted by determining the transmission pattern such that the speed of a transmission input terminal increases when the electric load increases and thus securing the engine charge power for the battery charge.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for controlling a transmission pattern of a hybrid vehicle, the method comprising:
   determining, by a controller, the transmission pattern by determining whether a battery state of charge (SOC) reference condition of the hybrid vehicle is satisfied,
   wherein the transmission pattern is determined by further inputting a compensation value based on a used amount of electric load when a current battery SOC is input into a transmission pattern determining part, and
   wherein the transmission pattern is a change in a transmission ratio.

2. The method of claim 1, wherein when the used amount of electric load is determined as increasing by a particular value or greater, a low stage-centered transmission pattern in which engine revolutions per minute (RPM) is able to increase is determined.

3. The method of claim 1, wherein the compensation value based on the used amount of electric load is obtained by calculating an electric load index using the total sum of electric power consumption and mapping the calculated electric load index as the compensation value to determine the transmission pattern.

4. The method of claim 3, wherein the electric load index using the total sum of the electric power consumption is calculated into a particular level value or greater, an intermediate value, and a particular level value or less.

5. The method of claim 1, wherein when the current SOC is equal to or greater than a particular boundary value, a relay is switched on to determine the transmission pattern matching with the drive mode based on a driver intention.

6. The method of claim 1, wherein when the current SOC is equal to or less than a particular boundary value, a relay is switched off to determine a low SOC transmission pattern that promotes battery charge.

7. An apparatus for controlling a transmission pattern of a hybrid vehicle, the apparatus comprising:
   a transmission pattern determining part configured to determine the transmission pattern by determining whether a battery state of charge (SOC) reference condition of the hybrid vehicle is satisfied; and
   an electric load compensation value calculating part configured to input a compensation value based on a used amount of electric load when a current battery SOC is input into the transmission pattern determining part,
   wherein when the used amount of electric load is determined as increasing by a particular value or greater, a low stage-centered transmission pattern in which engine revolutions per minute (RPM) is able to increase is determined, and
   wherein the transmission pattern is a change in a transmission ratio.

8. The apparatus of claim 7, wherein the electric load compensation value calculating part is further configured to calculate an electric load index using the total sum of electric power consumption, and map the calculated electric load index as the compensation value to determine the transmission pattern.

9. The apparatus of claim 7, wherein when the current SOC is equal to or greater than a particular boundary value, a relay is switched on to determine the transmission pattern matching with the drive mode based on a driver intention.

10. The apparatus of claim 7, wherein when the current SOC is equal to or less than a particular boundary value, a relay is switched off to determine a low SOC transmission pattern that promotes battery charge.

* * * * *